(12) United States Patent
Misiaszek

(10) Patent No.: US 12,154,084 B2
(45) Date of Patent: Nov. 26, 2024

(54) INTELLIGENT DATA TRANSMISSION BETWEEN PARTIES

(71) Applicant: Truist Bank, Charlotte, NC (US)

(72) Inventor: Alex Heath Misiaszek, Cornelius, NC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 17/892,730

(22) Filed: Aug. 22, 2022

(65) Prior Publication Data

US 2024/0062175 A1 Feb. 22, 2024

(51) Int. Cl.
*G06Q 20/10* (2012.01)
*G06F 9/451* (2018.01)

(52) U.S. Cl.
CPC ......... *G06Q 20/1085* (2013.01); *G06F 9/453* (2018.02)

(58) Field of Classification Search
CPC ............................ G06Q 20/1085; G06F 9/453
See application file for complete search history.

(56) References Cited

U.S. PATENT DOCUMENTS

| 10,019,714 | B1 * | 7/2018 | Hartman | G06Q 40/02 |
|---|---|---|---|---|
| 10,825,073 | B1 * | 11/2020 | Walters | G06N 5/046 |
| 10,909,124 | B2 * | 2/2021 | Lim | G06N 20/00 |
| 11,212,241 | B1 * | 12/2021 | Pace, Jr. | G06Q 40/02 |
| 11,348,601 | B1 * | 5/2022 | Deshpande | G06F 40/30 |
| 11,748,806 | B2 * | 9/2023 | Walters | G06Q 20/401 |
| | | | | 705/42 |
| 11,825,023 | B2 * | 11/2023 | Spohrer | G06N 5/043 |
| 2018/0247648 | A1 * | 8/2018 | Nadimpalli | G10L 15/22 |
| 2023/0045699 | A1 * | 2/2023 | Shain | G07C 9/38 |

* cited by examiner

*Primary Examiner* — Scott S Trotter
*Assistant Examiner* — William D Newlon
(74) *Attorney, Agent, or Firm* — Kilpatrick Townsend & Stockton LLP; Michael A. Springs, Esq.

(57) ABSTRACT

A computer-implemented method includes generating an interactive channel by a first party to provide a plurality of guided options to a second party. Additionally, the method includes receiving a request, via the interactive channel, from the second party and determining an intent of the request from the second party by a machine-learning algorithm. Further, the method includes generating an insight based on the determined intent of the request and a user profile of the second party and transmitting the insight, via the interactive channel, to the second party.

17 Claims, 3 Drawing Sheets

INTELLIGENT DATA TRANSMISSION BETWEEN PARTIES

TECHNICAL FIELD

The present disclosure relates generally to data transmission, more particularly (although not necessarily exclusively), to facilitating intelligent data transmission between parties.

BACKGROUND

Transactions can be made through a variety of devices, including automated teller machines (ATMs), point of sale (POS) devices, smartphones, and personal computers. A user of a device may execute a transaction without knowing insights and analysis about a transaction. For example, the user may make several automated transactions involving services that are rarely used. To obtain relevant information, the user may review a set of transaction records manually to identify the unnecessary automated transactions or to manually analyze sets of transaction records.

SUMMARY

In an example, a system includes a processing device and a non-transitory computer-readable memory that is executable by the processing device to perform operations. The operations include generating an interactive channel by a first party to provide a plurality of guided options to a second party. The operations also include receiving a request, via the interactive channel, from the second party and determining an intent of the request from the second party by a machine-learning algorithm. Additionally, the operations include generating an insight based on the determined intent of the request and a user profile of the second party and transmitting the insight, via the interactive channel, to the second party.

In an additional example, a computer-implemented method includes generating an interactive channel by a first party to provide a plurality of guided options to a second party. Additionally, the method includes receiving a request, via the interactive channel, from the second party and determining an intent of the request from the second party by a machine-learning algorithm. Further, the method includes generating an insight based on the determined intent of the request and a user profile of the second party and transmitting the insight, via the interactive channel, to the second party.

In an additional example, a non-transitory computer-readable medium includes program code that is executable by one or more processors for causing the one or more processors to perform operations. The operations include generating an interactive channel by a first party to provide a plurality of guided options to a second party. The operations also include receiving a request, via the interactive channel, from the second party and determining an intent of the request from the second party by a machine-learning algorithm. Additionally, the operations include generating an insight based on the determined intent of the request and a user profile of the second party and transmitting the insight, via the interactive channel, to the second party.

DETAILED DESCRIPTION

Figure 1:
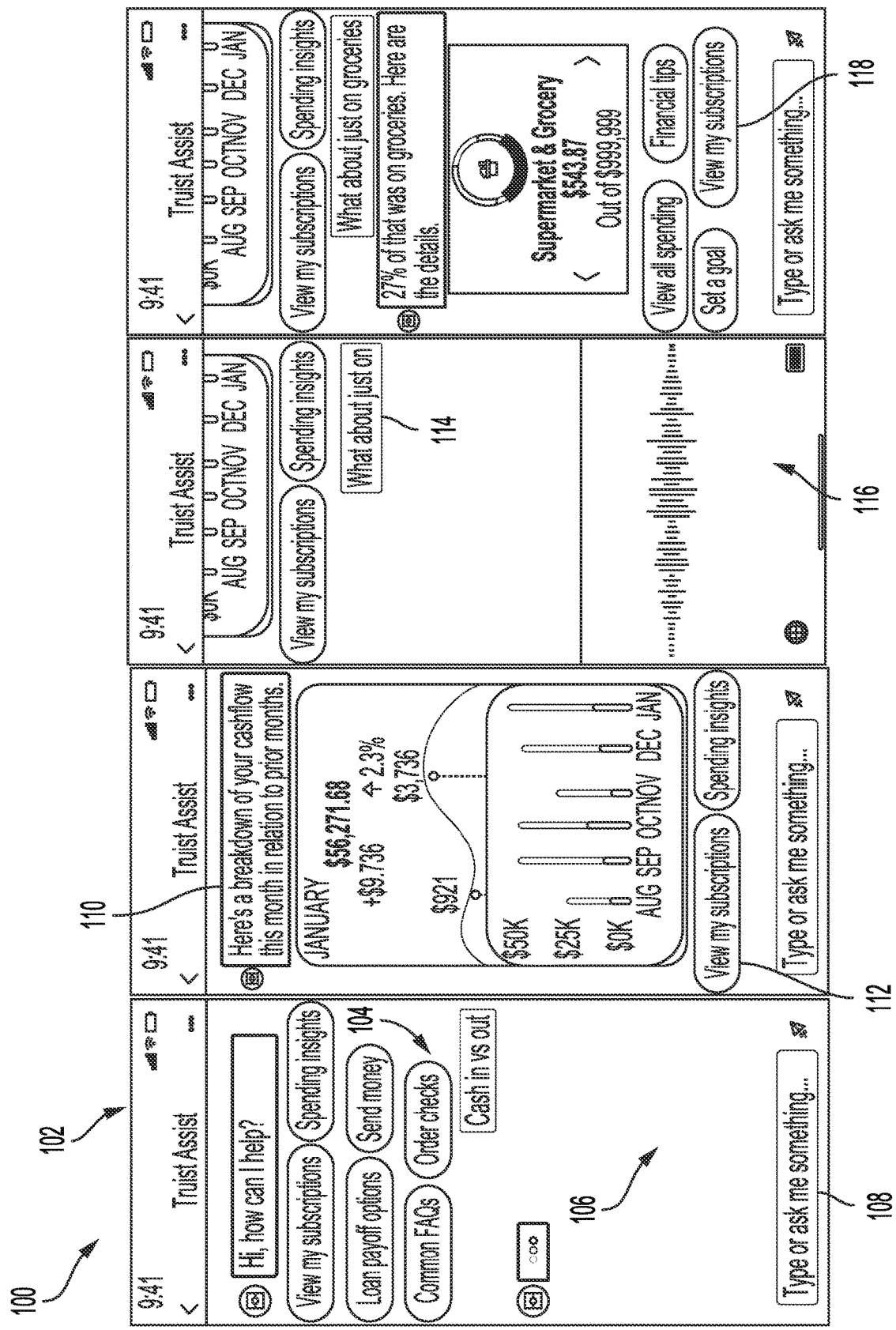
FIG. 1 is an example illustrative of a conversation with interactive insights via a graphical user interface, according to one example of the present disclosure.

Certain aspects and examples of the present disclosure relate to facilitating intelligent data transmission between parties. In some examples, the intelligent data transmission may provide information used to assist users in accessing and managing transactions with provided insights. A transaction may be performed by a user with the aid of insights. The transaction may include any exchange of money, credit, debt, property, voucher, or other asset where an electronic device facilitates the transaction. The insights may include any information relevant to the transaction based on historical transaction trends of the user.

Assisting the user in assessing and managing assets with the insights may enable the user to complete transactions with confidence gleaned from the intelligent data transmissions. With the insights from the intelligent data transmissions, the user may identify the total transaction amounts from various transaction categories. For example, the user may review grocery expenditures for a specified time period that are presented in statistical data.

In some examples, the user may be assisted in a conversation with an automated virtual assistant that may be able to provide financial insights for making a transaction. The conversation may be performed on a personal electrical device, such as a smartphone or other computing device. When the user has a conversation with the automated virtual assistant, the user may be asked some questions at the beginning of the conversation about which type of service the user would like to discuss. The user may answer the questions through the electrical device during the conversation. For example, the user may use a touchscreen to select a specific type of service they want to have from a set of option buttons. In another example, the user may type a specific request for information through a dialogue text box during the conversation via touchscreen or other manners built into the electrical device. Additionally, the user may use voice input or other types of input to indicate a particular request.

In some examples, the virtual assistant may leverage machine-learning algorithms to provide guided option buttons to prompt requests in which the user may be interested. In additional examples, the machine-learning algorithms may be used to provide intelligence for the automated virtual assistant. During the conversation, the automated virtual assistant may provide several service options to the user that the user may be interested in and may be predicted by the machine-learning algorithms. Upon receiving the request from the user, the automated virtual assistant may recognize the needs and intents of the user from their request and provide financial insights to the user based on various data, including a user profile of the user and historical transaction data of the user. The user profile may be personalized data associated with the user. For example, the user profile may include detailed information about the user, which include name, age, psychographics data, etc. The user profile can also include information about the purchasing behaviors of the user, pain points, etc. Banks and financial service companies may use the user profile in building user engagement tools. Historical transaction data can be information gathered from transactions taking place by the users. For example, the historical transaction data may include cash flow for each historical transaction in the past, as shown in FIG. 1.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is an example illustrative of conversation 100 with interactive insights via a graphical user interface, according to one example of the present disclosure. Users can request to begin conversation 100 by submitting a request. One or more servers of a bank, for example, may generate an interactive channel 102 for the automated virtual assistant in a platform provided by the bank. The interactive channel can be transmitted and operated on a personal device of the user, such as a smartphone or similar. The automated virtual assistant may start a dialogue with the user with a text message or guided option buttons 104. The guided option buttons 104 may be generated based on the user profile of the user or historical transaction data of the user. In the interactive channel 102, the text message and guided option buttons 104 may be shown in a dialogue area 106. In a response to the text message or guided option buttons 104, the user may use an insertion box 108 to insert text replying to the automated virtual assistant using a touchscreen on the smartphone. In other examples, the user may indicate service of interest by selecting a guided option button 104. In another example, the user may directly type a text message via the insertion box 108 for the reply. Additionally, the user may use a speak-to-text function of the interactive channel 102 to input text into the insertion box 108 or directly into the dialogue area 106.

Upon receiving the request from the user, the automated virtual assistant may generate financial insights 110 for the user based on the request. For example, the user may inquire about the cash flow of the account balance by typing text within the insertion box 108. In some examples, financial insights can be generated based on the request from the user, historical transaction data, and the user profile about the user. In some examples, the financial insights may be shown via the user's graphical user interface (GUI). The financial insights 110 may be represented in the form of statistical data analyzed by statistical analysis methods, such as mean, standard deviation, regression, hypothesis testing, sample size determination, etc. Additionally, the statistical tools analysis methods can be performed by commercial statistical tools or software, for examples, SPSS, R, MATLAB, Microsoft Excel, SAA, etc. As a result, the statistical data may be provided to the user in the dialogue area 106 of the GUI. The financial insights 110 may include text messages, statistical graphics, and audible information. After the insights 110 have been generated and transmitted to the user, the dialogue area may provide additional guided option buttons 112 related to the insights 110 for further conversation. For example, the additional guided option buttons 112 may include viewing subsections, services for the user relating to the financial insights 110, which may include cash flow in a specified period of time, spending summary at a particular month, date or time, etc.

The user may continue to respond to the financial insights 110 shown in the dialogue area 106 or opt-out of further conversation. The request 114 from the user can be done by selecting one or more guided option buttons 112 or typing in the insertion box 108 with questions or indications. Other examples of responding to the insights may include voice messages received by the user's device (e.g., the smartphone). The voice messages may be shown in the dialogue area 106 with a signal indication 116 to represent the message.

Another example of responding to the insights 110 may involve a voice recognition technique to convert a voice signal to a textual request 114. Upon receiving a further request 118 from the user, the automated virtual assistant may generate corresponding financial insights 120 for the user. The corresponding financial insights 120 may be generated based on the previous insights 112, the previous request 114, the current request 118, the user profile, and historical transaction data depending on the machine-learning algorithms (e.g., through the virtual assistant or similar). The corresponding financial insights 120 may be shown in the dialogue area 106 of the GUI for the user's review. Similarly, the financial insights 120 may include further guided option buttons that are predicted by machine-learning algorithms.

Certain examples of responding to the initial insights 110 may involve an interactive tool included as part of the interactive channel 102 to provide various ways of responding to the initial insights 110. As an example, the interactive tool may include voice recognition associated with the signal indication 116 to convert a voice signal to a textual response. In an additional example, the interactive tool may incorporate an insertion box 108 that allows a user to type text as the text response. The interactive tool may also provide relevant guided options for a user to select (e.g., with a touchscreen input) as a response. Upon receiving a response from the user, the automated virtual assistant may generate further financial insights for the user based on the response. The further financial insights may be generated based on the previous insights 112, the previous request 114, the current request 118, the response, the user profile, and historical transaction data depending on the machine-learning algorithms (e.g., through the virtual assistant or similar). The further financial insights may be shown in the dialogue area 106 of the GUI for review by the user. Similarly, the further financial insights may include further guided option buttons that are predicted by machine-learning algorithms.

Figure 2:
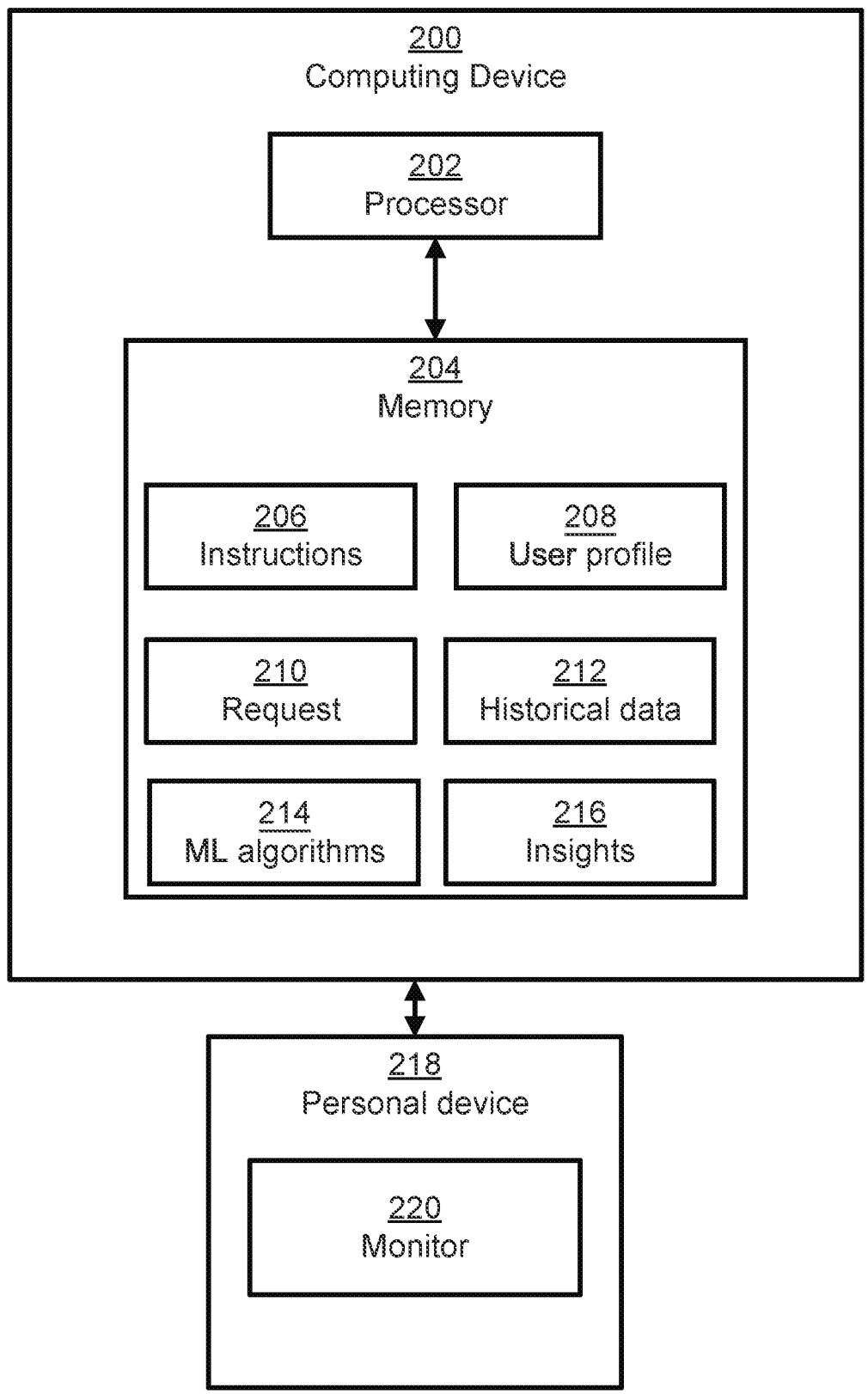
FIG. 2 is a block diagram of an example computing device, according to one example of the present disclosure.

FIG. 2 is a block diagram of an example computing device according to one example of the present disclosure. The computing device 200 includes a processor 202 that is communicatively coupled to a memory 204. In some examples, the processor 202 and the memory 204 may be distributed from (e.g., remote to) one another.

The processor 202 can include one processing device or multiple processing devices. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. In some examples, the instructions 206 can include processor-specific instructions generated by a compiler or an interpreter from code written in a suitable computer-programming language, such as C, C++, C #, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory, computer-readable medium from which the processor 202 can read instructions 206. A computer-readable medium can include electronic, optical, magnetic, or other storage devices capable of providing the processor 202 with computer-readable instructions or other program codes. Non-limiting examples of a computer-readable medium include magnetic disk(s), memory chip(s), ROM, random-access memory (RAM), an ASIC, a configured processor, optical storage, or any other medium from which a computer processor can read the instructions 206.

The memory 204 may further include the user profile 208 about the user, requests 210 from the user, historical data 212 of user transactions, machine-learning algorithms 214, and generated insights 216. The user profile 208 may be personalized data about the user. The user profile 208 can be analyzed by the machine-learning algorithms 214 along with historical data 212 and the requests 210 from the user to generate the insights 216 for the user. The historical data can be historical transaction data gathered from transactions taking place between users and banks. The computing device 200 may be communicatively coupled to a personal device 218. The personal device 218 may contain, or be communicatively coupled to, a monitor 220, which is able to display a graphical user interface including the interactive channel 102.

Figure 3:
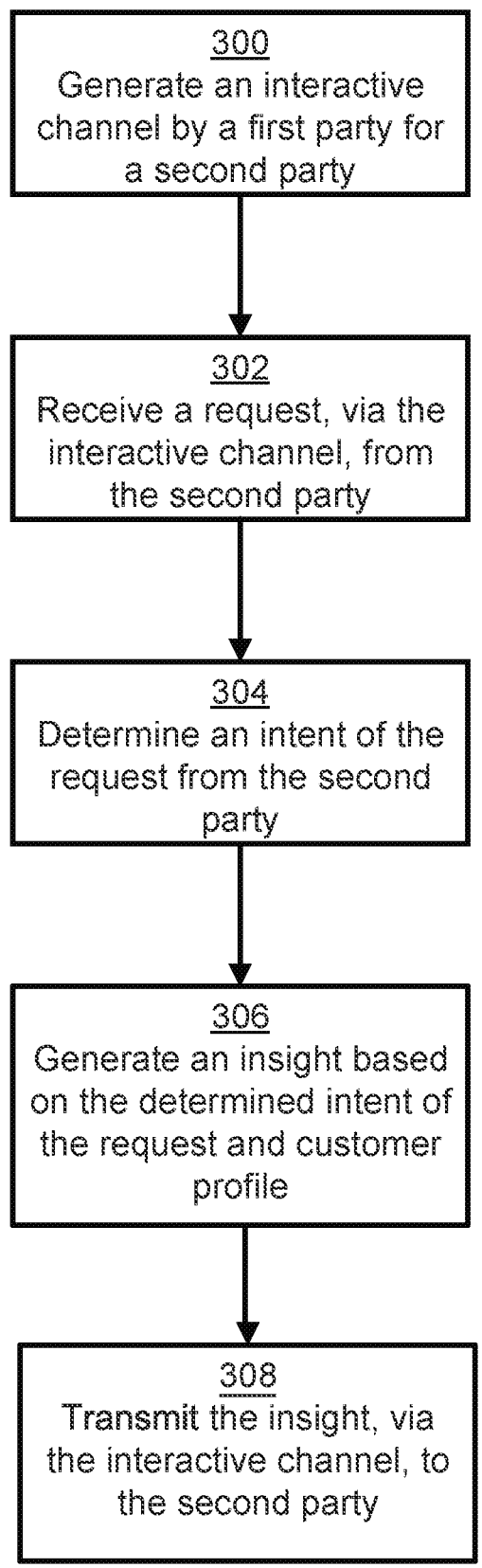
FIG. 3 is a flowchart of an example of a process for implementing some aspects of the present disclosure.

FIG. 3 is a flowchart of an example of a process for implementing some aspects of the present disclosure. At block 300, a first party can use the computing device 200 to generate the interactive channel 102 to provide a plurality of guided options to a second party. The first party may be a service provider for the second party. Specifically, the first party can be an automated virtual assistant. The second party can be the user. The interactive channel 102 may be carried out by an electrical device (i.e., the personal device 218) integrated with the monitor 220. For example, referring to FIG. 1, the automated virtual assistant can generate the interactive channel 102 to initiate a conversation with the user in the dialogue area 106. The initiated conversation may include text messages and guided option buttons 104 generated by machine-learning algorithms. The machine-learning algorithms may be applied to historical data, such as user transactions, associated with the user, prior user interactions with the guided option buttons 104, prior requests by the user received at the interactive channel, and the user profile to generate the guided option buttons 104. In some examples, the guided option buttons 104 are determined by the machine-learning model based on likelihood of use of the guided option buttons 104 by the particular user. Examples of the guided option buttons 104 may include "viewing subscriptions," "spending insights," "loan payoff options," "sending money," "FAQs," and "order checks."

At block 302, the computing device 200 can receive a request, via the interactive channel, from the second party. In some examples, the user (i.e., the second party) may swipe, tap, or draw a shape into the monitor 220 to send the request to the automated virtual assistant via the personal device 218. Then the automated virtual assistant can receive the request from the user via the computing device 200. The interactive channel 102 can be performed by a graphical user interface (GUI). For example, referring to FIG. 1, the interactive channel may provide a live chat screen similar to the dialogue area 106 via the GUI to the user. The user may type text messages to express their request via insertion box 108 or select at least one of the guided option buttons 104. Additionally, the user may express a selection using voice control provided to the personal device 218. For example, the user may inquire about cash flow information in their bank account for past and current transactions.

At block 304, the computing device 200 can determine an intent of the request from the second party using machine-leaning algorithms. In one example, the computing device 200 may utilize the machine-learning algorithms to parse and recognize the meaning of the request from the user (i.e., the second party). The machine-learning algorithms may involve natural-language understanding (NLU) or natural language processing (NLP). An NLU engine may analyze data (e.g., a request from the user) to determine the meaning (i.e., the intent of the request) by using algorithms to reduce human speech into a structured ontology. The NLP is the ability of a computer program to understand human language as it is spoken and written. In some examples, the NLU engine or an NLP engine may provide users with the ability to speak in fragments or natural language while the engines map the fragmented or natural language speech to the appropriate or relevant insight or information. Further, by determining intent of the user through the NLU engine or the NLP engine, the computing device 200 may, in some examples, be able to generate insights in a client-generated and led manner, rather than in a system generated manner based on ranking algorithms.

Other information may also be used by the machine-learning algorithms to determine the intent of the request. For example, the machine-learning algorithms may receive location information about the current location of the user as perceived by the personal device 218. The received location information can be used to determine the intent of the request. A user shopping at a particular grocery store may ask the automated virtual assistant how much they spent on groceries last month. Based on the request from the user, the machine-learning algorithms can determine the intent of the request (e.g., the amount of groceries spending) and generate financial insight 112 about the particular grocery store where the user is currently located. As a result, the automated virtual assistant may provide the user with financial insight 112 regarding an amount of grocery spending generally over the previous month, and the information can also be narrow to spending at the particular grocery store over the last month.

At block 306, the computing device 200 may generate insights 112 based on the intent of the request and the user profile of the second party. As discussed previously, the location information perceived by the personal device 218 can also be used in generating the insights 112 by the computing device. The computing device 200 may be operated locally within the banks, operated separately from one or more remote servers, or provided by third-party services. Referring to FIG. 1, examples of the insights may include, but not be limited to, the requested cash flow information (i.e., the insights 112) for the user (i.e., the second party) that has been demonstrated with statistical data via the GUI, which may be generated on the monitor 220.

The generated insights 112 may involve a series of processes. In one example, the computing device 200 may retrieve a historical data about the second party from the memory 204 and generate insights 112, which include information associated with the retrieved historical data. For example, historical cash flow information may be included in the historical data and may be used to generate the insights with relevant time information. For instance, insights 112 can be generated that demonstrate cash flow balances for the past six months and detected changes each month over that period of time.

In another example, the computing device 200 may perform statistical analysis based on the historical data, the intent of the request, and the user profile which are stored in the memory 204. The results of statistical analysis can be used in demonstrating the insights 112. Specifically, the automated virtual assistant may display the results of the statistical analysis on the monitor 220 for the user with one or more visualization tools. Examples of the visualization tools may include a bar chart, a pie chart, a histogram, or the like. As an example, in FIG. 1, the automated virtual may display cash flow balances in a bar chart visualization. Another example depicted in FIG. 1 is an indication of grocery spending in a pie chart, which reflects the percentage of grocery spending related to total expenditures.

Continuing to above example, the automated virtual assistant may receive location information perceived by the personal device 218 and transmit the received location information to the computing device 200. In some examples, the computing device 200 can generated insights according to a detected location of the user. As an example, the insight can be demonstrated in a pie chart to display the spending amount at a particular grocery store of the user's current location as a percentage of total grocery spending.

At block 308, the computing device 200 can display the insight to the second party via the interactive channel. For example, the automated virtual assistant may display a result of the statistical analysis (i.e., the insights 112) to the user (i.e., the second party) using the GUI, which may be generated on the monitor 220 of the personal device 218. The insights may be financial insights that provide the user with information about assets and analysis of the results. For example, referring to FIG. 1, insights 112 can be a cash flow bar chart for the past several months that can be displayed on the monitor 220.

Continuing the process described in FIG. 3, the computing device 200 may generate further guided options after the insight has been transmitted and displayed to the user via the interactive channel. The computing device 200 may receive a response related to the further guided options from the user through the interactive channel. In an example, the interactive channel can include an interactive tool that enables the user to input text through a touchscreen or a voice receiver. Upon receiving the response from the user, the computing device 200 can generate a further insights in a manner similar to the process described in FIG. 3.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processing device; and
   a non-transitory computer-readable memory that is executable by the processing device to perform operations comprising:
   generating an interactive channel by a first party that comprises a virtual assistant to provide a plurality of guided options to a second party via a graphical user interface (GUI) in a mobile banking application, the plurality of guided options providable by the GUI based at least in part on a pending transaction involving the second party;
   receiving a request, via the interactive channel, from the second party;
   receiving location information from a personal device associated with the second party;
   determining an intent of the request from the second party by a machine-learning algorithm using (i) a natural language processing engine or a natural language understanding engine embedded in the mobile banking application and (ii) the location information from the personal device of the second party;
   generating an insight based on the determined intent of the request and a user profile of the second party, the insight comprising a cash flow and spending summary for a predetermined time period that is prior to receiving the request, and the insight comprising one or more visualization tools that are configured to provide the insight graphically on the GUI;
   transmitting the insight, via the interactive channel, to the second party, the transmitting comprising populating the GUI with the one or more visualization tools;
   generating a set of updated guided options based at least in part on an interaction with the one or more visualization tools;
   arranging the set of updated guided options on the GUI in descending order of likelihood of relevance, based on the interaction, to the second party; and
   initiating the pending transaction based at least in part on subsequent input, based on the set of updated guided options, from the second party.

2. The system of claim 1, wherein the interactive channel comprises a graphical user interface (GUI) displayable on a computing device remote from the system.

3. The system of claim 2, wherein the operation of generating the insight based on the intent of the request and the user profile of the second party comprises:
   retrieving historical data about the second party;
   performing statistical analysis based on the historical data, the intent of the request, and the user profile of the second party; and
   transmitting a result of the statistical analysis via the GUI.

4. The system of claim 1, wherein the interactive channel comprises a dialogue area and an insertion box, wherein the dialogue area comprises a dialogue text box configured to display a conversation associated with intelligent data transmission between the first party and the second party, wherein the insertion box enables the second party to input text through a touchscreen or a voice receiver of the second party.

5. The system of claim 1, wherein the operations further comprise:
   generating the guided options based on historical data and the user profile of the second user.

6. The system of claim 1, wherein the request received from the second party is associated with the guided options.

7. A computer-implemented method comprising:
   generating an interactive channel by a first party that comprises a virtual assistant to provide a plurality of guided options to a second party via a graphical user interface (GUI) in a mobile banking application, the plurality of guided options providable by the GUI based at least in part on a pending transaction involving the second party;
   receiving a request, via the interactive channel, from the second party;
   receiving location information from a personal device associated with the second party;
   determining an intent of the request from the second party by a machine-learning algorithm using (i) a natural language processing engine or a natural language processing engine or a natural language understanding engine embedded in the mobile banking application and (ii) the location information from the personal device of the second party;

generating an insight based on the determined intent of the request and a user profile of the second party, the insight comprising a cash flow and spending summary for a predetermined time period that is prior to receiving the request, and the insight comprising one or more visualization tools that are configured to provide the insight graphically on the GUI;

transmitting the insight, via the interactive channel, to the second party, the transmitting comprising populating the GUI with the one or more visualization tools;

generating a set of updated guided options based at least in part on an interaction with the one or more visualization tools;

arranging the set of updated guided options on the GUI in descending order of likelihood of relevance, based on the interaction, to the second party; and initiating the pending transaction based at least in part on subsequent input, based on the set of updated guided options, from the second party.

8. The method of claim 7, wherein the interactive channel comprises a graphical user interface (GUI) displayable on a computing device.

9. The computer-implemented method of claim 8, wherein generating the insight based on the intent of the request and the user profile of the second party comprises:
retrieving historical data about the second party;
performing statistical analysis based on the historical data, the intent of the request, and the user profile of the second party; and
transmitting a result of the statistical analysis via the GUI.

10. The computer-implemented method of claim 7, wherein the interactive channel comprises a dialogue area and an insertion box, wherein the dialogue area comprises a dialogue text box configured to display a conversation associated with intelligent data transmission between the first party and the second party, wherein the insertion box enables the second party to input text through a touchscreen or a voice receiver of the second party.

11. The computer-implemented method of claim 7, further comprising:
generating the guided options based on historical data and the user profile of the second user.

12. The computer-implemented method of claim 7, wherein the request received form the second party is associated with the guided options.

13. A non-transitory computer-readable medium comprising program code that is executable by one or more processors for causing the one or more processors to perform operations comprising:
generating an interactive channel by a first party that comprises a virtual assistant to provide a plurality of guided options to a second party via a graphical user interface (GUI) in a mobile banking application, the plurality of guided options providable by the GUI based at least in part on a pending transaction involving the second party;
receiving a request, via the interactive channel, from the second party;
receiving location information from a personal device associated with the second party;
determining an intent of the request from the second party by a machine-learning algorithm using (i) a natural language processing engine or a natural language understanding engine embedded in the mobile banking application and (ii) the location information from the personal device of the second party;
generating an insight based on the determined intent of the request and a user profile of the second party, the insight comprising a cash flow and spending summary for a predetermined time period that is prior to receiving the request, and the insight comprising one or more visualization tools that are configured to provide the insight graphically on the GUI;
transmitting the insight, via the interactive channel, to the second party, the transmitting comprising populating the GUI with the one or more visualization tools;
generating a set of updated guided options based at least in part on an interaction with the one or more visualization tools;
arranging the set of updated guided options on the GUI in descending order of likelihood of relevance, based on the interaction, to the second party; and
initiating the pending transaction based at least in part on subsequent input, based on the set of updated guided options, from the second party.

14. The non-transitory computer-readable medium of claim 13, wherein the interactive channel comprises a graphical user interface (GUI) displayable on a computing device.

15. The non-transitory computer-readable medium of claim 14, wherein the operation of generating the insight based on the intent of the request and the user profile of the second party comprises:
retrieving historical data about the second party;
performing statistical analysis based on the historical data, the intent of the request, and the user profile of the second party; and
transmitting a result of the statistical analysis via the GUI.

16. The non-transitory computer-readable medium of claim 13, wherein the interactive channel comprises a dialogue area and an insertion box, wherein the dialogue area comprises a dialogue text box configured to display a conversation associated with intelligent data transmission between the first party and the second party, wherein the insertion box enables the second party to input text through a touchscreen or a voice receiver of the second party.

17. The non-transitory computer-readable medium of claim 13, wherein the operations further comprise:
generating the guided options based on historical data and the user profile of the second user.

* * * * *